(12) United States Patent
Stokes et al.

(10) Patent No.: US 8,161,130 B2
(45) Date of Patent: Apr. 17, 2012

(54) BOTTOM-UP ANALYSIS OF NETWORK SITES

(75) Inventors: Jack W. Stokes, North Bend, WA (US);
Reid M. Andersen, Seattle, WA (US);
Kumar H. Chellapilla, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 247 days.

(21) Appl. No.: 12/421,644

(22) Filed: Apr. 10, 2009

(65) Prior Publication Data

US 2010/0262693 A1 Oct. 14, 2010

(51) Int. Cl.
*G06F 15/16* (2006.01)
(52) U.S. Cl. ............... 709/217; 709/225; 726/22
(58) Field of Classification Search .......... 709/225
See application file for complete search history.

(56) References Cited

U.S. PATENT DOCUMENTS

| | | |
|---|---|---|
| 7,096,500 B2 | 8/2006 | Roberts et al. |
| 2006/0031673 A1 | 2/2006 | Beck et al. |
| 2006/0253583 A1* | 11/2006 | Dixon et al. ............ 709/225 |
| 2006/0253584 A1 | 11/2006 | Dixon et al. |
| 2007/0074125 A1 | 3/2007 | Platt et al. |
| 2007/0208822 A1 | 9/2007 | Wang et al. |
| 2008/0034404 A1* | 2/2008 | Pereira et al. ............ 726/2 |
| 2008/0037791 A1 | 2/2008 | Jakobsson |
| 2008/0072325 A1 | 3/2008 | Repasi et al. |
| 2008/0301116 A1 | 12/2008 | Wang et al. |
| 2008/0301139 A1 | 12/2008 | Wang et al. |
| 2008/0301281 A1 | 12/2008 | Wang et al. |
| 2010/0192222 A1 | 7/2010 | Stokes et al. |
| 2010/0257592 A1 | 10/2010 | Wang et al. |
| 2011/0087648 A1 | 4/2011 | Wang et al. |

FOREIGN PATENT DOCUMENTS

WO 2007133694 A2 11/2007

OTHER PUBLICATIONS

Polychronakis, et al., "Ghost Turns Zombie: Exploring the Life Cycle of Web-based Malware," Proceedings of the 1st Usenix Workshop on Large-Scale Exploits and Emergent Threats, retrieved at <<http://www.usenix.org/event/leet08/tech/full_papers/polychronakis/polychronakis.pdf>>, 2008, 8 pages.

(Continued)

*Primary Examiner* — Phuoc Nguyen
*Assistant Examiner* — Adam Cooney

(57) ABSTRACT

An approach for identifying suspect network sites in a network environment entails using one or more malware analysis modules to identify distribution sites that host malicious content and/or benign content. The approach then uses a linking analysis module to identify landing sites that are linked to the distribution sites. These linked sites are identified as suspect sites for further analysis. This analysis can be characterized as "bottom up" because it is initiated by the detection of potentially problematic distribution sites. The approach can also perform linking analysis to identify a suspect network site based on a number of alternating paths between that network site and a set of distribution sites that are known to host malicious content. The approach can also train a classifier module to predict whether an unknown landing site is a malicious landing site or a benign landing site.

16 Claims, 9 Drawing Sheets

EXAMPLE 1

OTHER PUBLICATIONS

Zhuge, et al., "Studying Malicious Websites and the Underground Economy on the Chinese Web," Reihe Informatik, Technical Report TR-2007-011, retrieved at <<http://honeyblog.org/junkyard/reports/www-china-TR.pdf>>, Dec. 3, 2007, pp. 1-18.

Agarwal, Amit, "Detect if your Web Pages Link to Infected Sites or Serve Malware Themselves," retrieved at <<http://www.labnol.org/internet/detect-webpages-that-serve-malware/5597/>>, Nov. 26, 2008, 3 pages.

Moshchuk, et al., "A Crawler-based Study of Spyware on the Web," Proceedings of the 13th Annual Network and Distributed Systems Security Symposium, retrieved at <<http://www.isoc.org/isoc/conferences/ndss/06/proceedings/papers/spycrawler.pdf>>, 2006, 17 pages.

Provos, et al., "All your iFRAMEs point to us," Google Technical Report provos-2008a, retrieved at <<http://research.google.com/archive/provos-2008a.pdf>>, Feb. 4, 2008, 22 pages.

Provos, et al., "The Ghost in the Browser: Analysis of Web-Based Malware," Proceedings of the First Conference on First Workshop on Hot Topics in Understanding Botnets, retrieved at <<http://www.usenix.org/events/hotbots07/tech/full_papers/provos/provos.pdf>>, 2007, 9 pages.

Wang, et al., "Automated Web Patrol with Strider Honeymonkeys: Finding Web Sites that Exploit Browser Vulnerabilities," Proceedings of the 2006 Network and Distributed System Security Symposium, retrieved at <<http://www.isoc.org/isoc/conferences/ndss/06/proceedings/papers/honeymonkeys.pdf>>, 2006, 15 pages.

Maindonald, John, review of "Pattern Recognition and Machine Learning" by Christopher M. Bishop, Journal of Statistical Software, retrieved at <<http://research.microsoft.com/en-us/um/people/cmbishop/prml/bishop-ml.pdf>>, vol. 17, Jan. 2007, 3 pages.

Bishop, Christopher, contents and sample chapter 8 from Pattern Recognition and Machine Learning, retrieved at <<http://research.microsoft.com/en-us/um/people/cmbishop/prml/Bishop-PRML-sample.pdf>>, Springer, 1st edition, 2006, 82 pages.

* cited by examiner

ILLUSTRATIVE ALTERNATING PATH FOR K = 2

BOTTOM-UP ANALYSIS OF NETWORK SITES

BACKGROUND

Computing resources face an ever-present threat of becoming "infected" with malicious content. For instance, a user's computer may become infected when a user expressly downloads malicious content, e.g., by opening an Email attachment or clicking on a link on a network site. A user's computer may also acquire malicious content in a more passive manner. For example, a malicious network site can pass on malicious content in a "drive-by" fashion when the user simply visits the site without necessarily clicking on any links in that site. Many other techniques exist for propagating malicious content in a network environment. Further, even without harm caused to computing resources, there exists a risk that a malicious entity may acquire personal information regarding a user.

In a known approach, an analysis tool can investigate the safety of a particular site by accessing that site in a virtual machine (VM) mode of interaction. The site may link to one or more other sites. If so, the analysis tool can "follow" the links and access those other sites too. The analysis tool may identify the particular site as potentially harmful if that site (or its linked resources) causes an undesirable change in the state of the virtual machine. In one case, the change in the state of the virtual machine is caused by downloading a malicious file.

While useful, the above approach is not without its shortcomings. The threats within a network environment are very diverse and are in constant change. The above-described process (of accessing sites and following links) may require a significant amount of time to perform. It may therefore be difficult for such a process to keep abreast of evolving threats in a network environment.

SUMMARY

An illustrative approach is described for identifying suspect network sites using bottom-up analysis. The approach entails using one or more malware analysis modules to identify one or more distribution sites that host malicious content and/or benign content. The approach then uses a linking analysis module to identify one or more landing sites that are linked to the distribution sites. The landing sites can be identified as suspect sites for possible further analysis. This analysis can be characterized as "bottom up" because it originates with the detection of potentially problematic distribution sites.

According to another illustrative aspect, the linking analysis module can also be used to determine a number of alternating paths between a candidate site and a set of distribution sites that are known to host malicious content. If the candidate site and known undesirable sites have such a link-related affinity, the linking analysis module can identify the candidate site as a suspect site for possible further analysis.

According to another illustrative aspect, a landing site classification system can collect property information regarding landing sites, together with safety-related status information. The safety-related status information identifies whether the landing sites somehow invoke malicious content (e.g., by linking to malicious distribution sites or directly invoking malicious content). The landing site classification system can train a model based on the property information and the safety-related status information. The landing site classification system can then use the model to assess whether or not an unknown landing site is a malicious landing site or a benign landing site. Optionally, the landing site classification system can also classify the type of malicious (or benign) content associated with the unknown landing site.

The above approach can be manifested in various types of systems, components, methods, computer readable media, data structures, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth an approach for identifying benign and malicious network sites in a network environment. The disclosure is organized as follows. Section A describes an illustrative system for analyzing network sites using bottom-up analysis. Section B describes illustrative methods which explain the operation of the system of Section A. Section C describes illustrative processing functionality that can be used to implement any aspect of the features described in Sections A and B.

Figure 10:
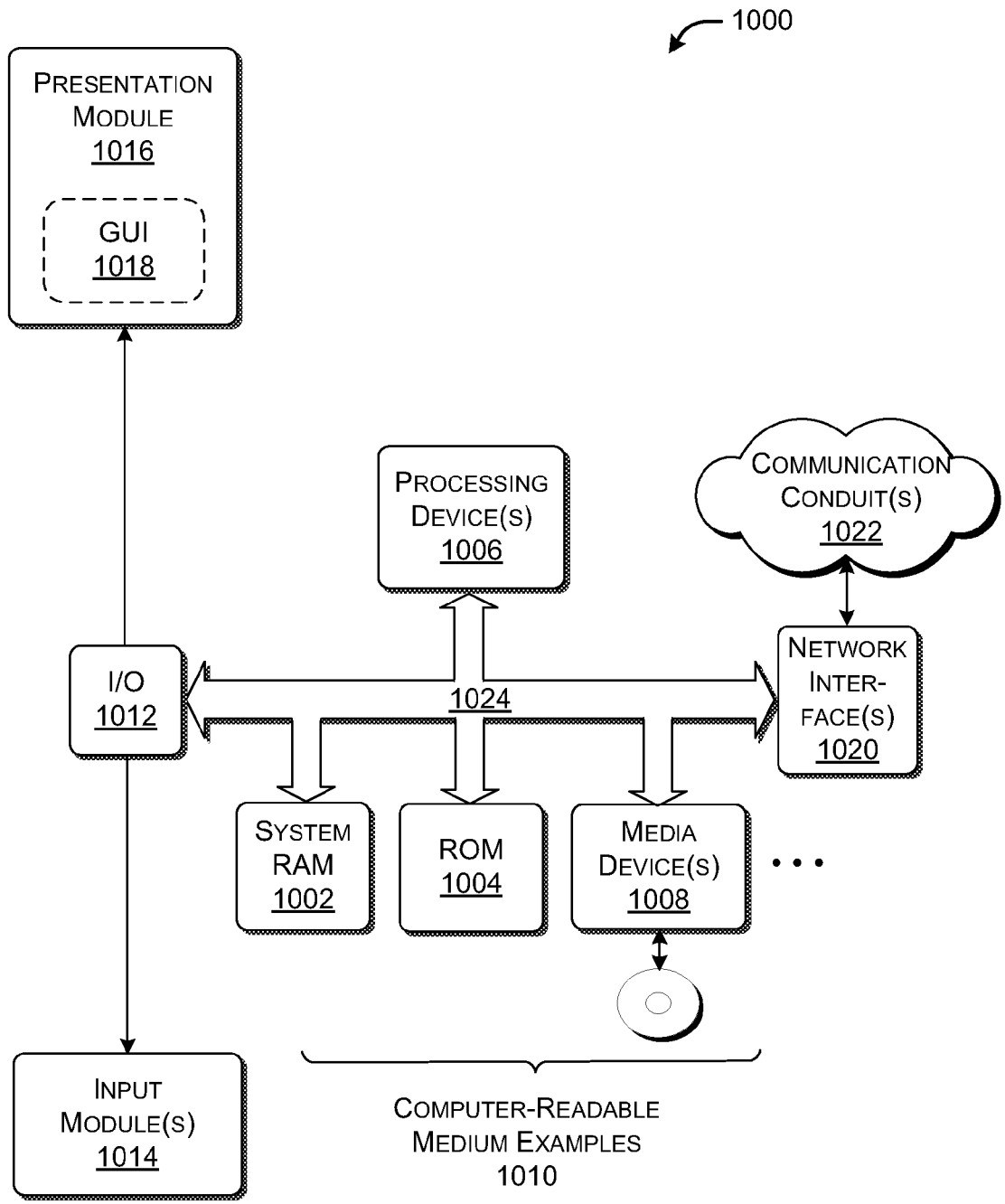
FIG. 10 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner, for example, by software, hardware (e.g., discrete logic components, etc.), firmware, and so on, or any combination of these implementations. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 10, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented by software, hardware (e.g., discrete logic components, etc.), firmware, manual processing, etc., or any combination of these implementations.

As to terminology, the phrase "configured to" or the like encompasses any way that any kind of functionality can be constructed to perform an identified operation. The functionality can be configured to perform an operation using, for instance, software, hardware (e.g., discrete logic components, etc.), firmware etc., and/or any combination thereof.

The term "logic" encompasses any functionality for performing a task. For instance, each operation illustrated in the flowcharts corresponds to logic for performing that operation. An operation can be performed using, for instance, software, hardware (e.g., discrete logic components, etc.), firmware, etc., and/or any combination thereof.

A. Illustrative Systems

A.1. System Overview

Figure 1:
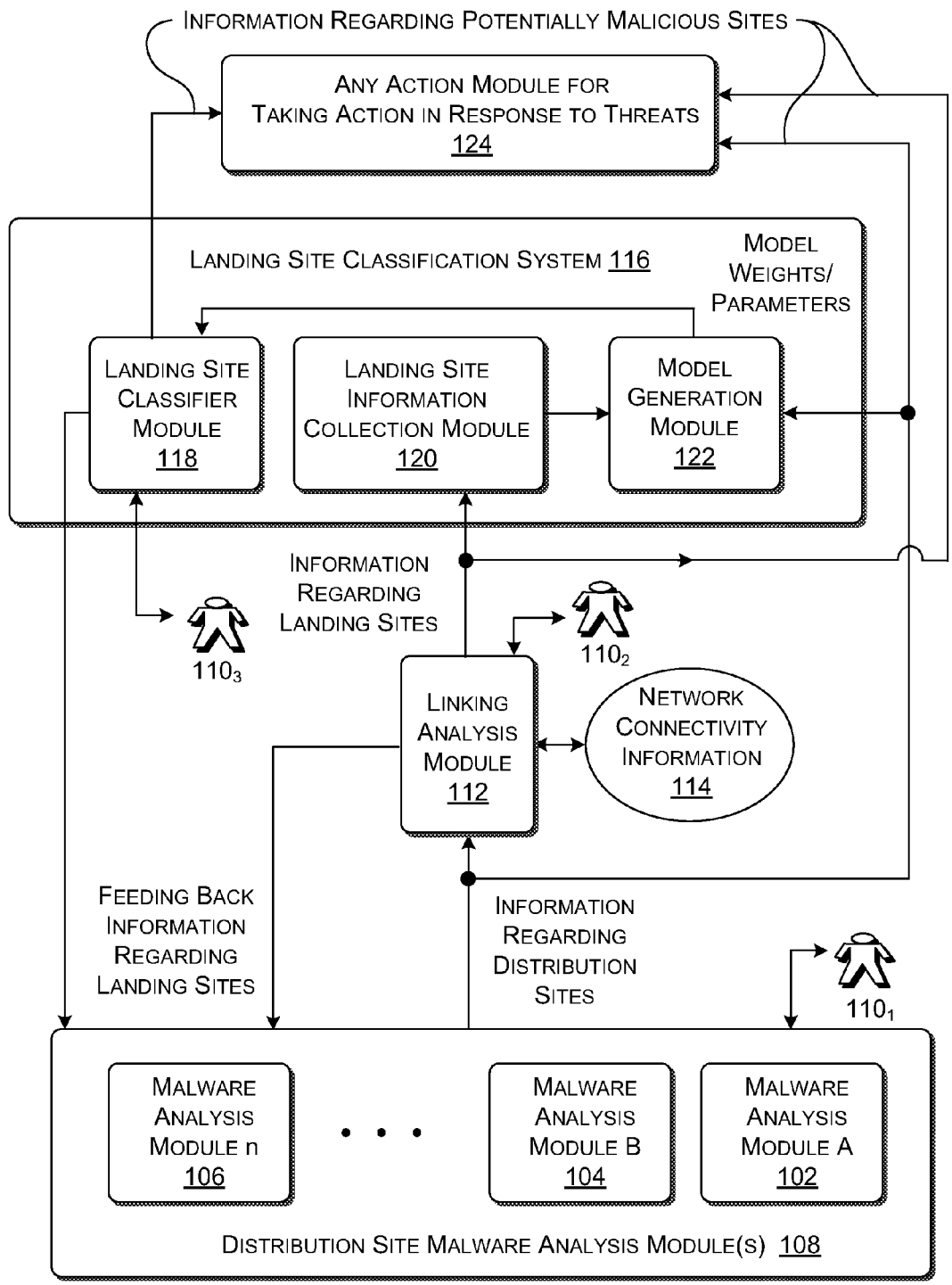
FIG. 1 shows an illustrative system for identifying suspect network sites in a network environment using bottom-up analysis.

FIG. 1 shows one illustrative system 100 for identifying malicious and benign network sites. This section provides an overview of the system 100. Later sections provide additional detail regarding individual features in FIG. 1.

To begin with, a malicious network site is a network-accessible site that poses some identifiable risk of subjecting a user or some computing resource to malicious content. The term "malicious content" should be construed broadly as used herein. Malicious content is content that is deemed undesirable from the perspective of any user or entity for any reason. Without limitation, common examples of malicious content include: malware content that causes harm to computing resources or causes the computing resources to act in an undesirable manner; adware content that subjects the user to unwanted advertising content; spyware content that attempts to access sensitive information or resources; phishing scam content that attempts to solicit sensitive information from a user, and so on. Malicious content can take the form of executables, scripts, documents, images, information presented on a network page, and so on.

The term "suspect site" encompasses a site that, on the basis for any kind of analysis, is suspected as being a malicious site or a benign site. In the explanation which follows, the negative connotation of the term suspect site sometimes predominates (in which a suspect site is suspected of being malicious). But, as stated, the term suspect site also encompasses a site that is suspected of being benign.

The analysis performed by the system 100 is bottom-up in the sense that the analysis begins with examination of distribution sites. Distribution sites that host malicious content are referred to herein as malicious distribution sites. Distribution sites that do not host any malicious content are referred to as benign distribution sites. On the basis of knowledge regarding the distribution sites, the system 100 determines malicious landing sites and benign landing sites. Generally, a landing site refers to any network site that is directly accessible to a user (or other entity), e.g., by clicking on a link associated with that network site, typing the address of that network site into a browsing module, and so on. A malicious landing site is a landing site that invokes malicious content, e.g., by directly hosting malicious content, and/or by directly or indirectly linking to a malicious distribution site. A benign landing site is a landing site that does not invoke malicious content, e.g., because the landing site does not directly host malicious content, nor does it either directly or indirectly link to a malicious distribution site.

Since the analysis is bottom up in nature, the explanation will start with that functionality in the system 100 which enables it to detect malicious and benign distribution sites. Namely, the system 100 may include one or more malware analysis modules, e.g., malware analysis module A 102, malware analysis module B 104, malware analysis module n 106, and so on. These malware analysis modules (102, 104, ... 106) are collectively labeled as distribution site malware analysis modules 108 (or just "malware analysis modules" for brevity). The malware analysis modules 108 detect the presence of malicious distribution sites using different respective techniques. Although not always expressly mentioned below, it should be understood that the malware analysis modules 108 may also identify benign distribution sites. Section A.2 provides additional details regarding the malware analysis modules 108.

The outcome of the analysis performed by the malware analysis modules 108 may constitute a "seed" set of suspect distribution sites on which further analysis can be based, as described below. These sites are suspect sites because they are suspected of being malicious distribution sites (or benign distribution sites). FIG. 1 shows a human icon to indicate that a human analyst $110_1$ can interact with the various malware analysis modules 108 to supplement the analysis performed by the malware analysis module 108. For instance, the human analyst $110_1$ can determine whether the distribution sites identified as malicious are indeed malicious distribution sites.

A linking analysis module 112 determines the landing sites that either directly or indirectly link to the identified malicious distribution sites. The linking analysis module 112 can also identify landing sites which directly or indirectly link to benign distribution sites. The linking analysis module 112 can perform this operation by making reference to network connectivity information 114. The network connectivity information 114 identifies links among various sites in a network environment, such as the Internet. Collectively, the network connectivity information may form a directed graph of links. For any given node in the graph, the links which point to the node are referred to as in-links. The links which point out from the node are referred to as out-links. A network crawling tool (not shown) or the like can create the network connectivity information 114 and update it on any basis. Section A.3 provides additional details regarding the linking analysis module 112.

The outcome of the analysis performed by the linking analysis module 112 may constitute suspect sites because they are suspected of being malicious landing sites (or benign landing sites). Again, a human analyst $110_2$ can interact with the linking analysis module 112 to supplement the analysis performed by the linking analysis module 112. For instance, the human analyst $110_2$ can determine whether the landing sites identified as malicious are indeed malicious landing sites.

In FIG. 1, an arrow points from the linking analysis module 112 to the malware analysis modules 108. This is meant to indicate that the malware analysis modules 108 can potentially identify additional malicious distribution sites and benign distribution sites on the basis of the analysis provided by the linking analysis module 112. The malware analysis modules 108 can further test the conclusions reached by the linking analysis module 112, such as by determining whether the landing sites identified as malicious do in fact invoke malicious content.

The linking analysis module 112 also provides its results to a landing site classification system 116. The landing site classification system 116 includes functionality for creating a model for use in classifying unknown landing sites. This model is referred to as a landing site classifier module 118. The landing site classification system 116 also encompasses the use of the landing site classifier module 118 to classify unknown landing sites.

The landing site classification system 116 includes a landing site information collection module 120 ("collection module" for brevity). The collection module 120 receives information regarding malicious and benign landing sites from one or more sources, such as the linking analysis module 112. The collection module 120 then identifies various properties of these landing sites. This information collectively defines property information. The collection module 120 can obtain the property information from various sources, such as metadata provided by the network connectivity information 114. Alternatively, or in addition, the collection module 120 can directly access the landing sites to retrieve information about these sites.

Section A.4 below provides detailed information regarding illustrative property information that, in one implementation, can be collected that characterizes the landing sites. By way of overview, the collection module 120 can collect metadata which describes the kinds of content hosted by the landing sites. Further, the collection module 120 can collect metadata which identifies the ways in which the landing sites are associated with other sites, and so on.

A model generation module 122 creates the landing site classifier module 118. To perform this task, the model generation module 122 operates on a training data set. The training data set includes the above-described property information regarding landing sites. The training data set also includes safety-related status information regarding the landing sites. As used herein, safety-related status information indicates whether the landing sites are benign or malicious, e.g., based on whether these landing sites somehow invoke malicious content. The model generation module 122 uses this training data set to create the landing site classifier module 118. That is, the outcome of the training operation performed by the model generation module 122 is a set of weights or parameters which defines the landing site classifier module 118.

Once trained and placed in use, the landing site classifier module 118 can examine an unknown landing site to determine whether it is a suspect landing site, that is, whether the unknown landing site is a malicious landing site or a benign landing site. A landing site may be malicious because it contains malicious content or links to a malicious distribution site. The landing site classifier module 118 performs its classifying operation by first identifying property information associated with the unknown landing site. The landing site classifier module 118 can then apply its trained weights or parameters to generate a score associated with the unknown landing site. The score identifies whether the landing site is a suspect landing site, such as a malicious landing site (or a benign landing site). In addition, the landing site classifier can identify the type of threat posed by the landing site or, if assessed as benign, the type of benign content associated with the landing site.

Again, note that the outcome of the landing site classifier module 118 can feed back into the malware analysis modules 108. Through this feedback, the malware analysis modules 108 can test the conclusions reached by the landing site classifier module 118. This may result in strengthening or weakening the conclusions reached by the landing site classifier module 118. For example, one of the malware analysis modules 108 can download and examine the content linked to a potentially malicious landing site. In addition, or alternatively, the malware analysis modules 108 can use the conclusions of the landing site classifier module 118 to identify additional malicious distribution sites. Further, a human analyst $110_3$ can review the conclusions reached by the landing site classifier module 118.

Finally, FIG. 1 indicates that any action module 124 can be employed to take action based on the conclusions reached by the malware analysis modules 108, the linking analysis module 112, and/or the landing site classifier module 118. For example, the action module 124 can warn the user if he or she is attempting to access a landing site that is suspected to be a malicious landing site. Alternatively, or in addition, the action module 124 can prevent the user from accessing the suspect landing site, or from even gaining knowledge about the suspect landing site. For example, a search engine can omit suspect landing sites from a list of search results returned to a user, even though these sites may match the user's query. The action module 124 can take yet other types of preventative or corrective measures to reduce the potential harm that any network site can cause to a user.

In one case, the overall analysis represented by the system 100 can be performed as a background process as users interact with a network environment, such as the Internet. In this implementation, the system 100 will be continually updating its conclusions in response to newly discovered suspect network sites.

To repeat, the approach described above is "bottom-up" in the sense that it starts with an analysis of distribution sites and then expands these conclusions to identify suspect landing sites. Further, the conclusions reached by different parts of the system 100 (the malware analysis modules 108, the linking analysis module 112, and the landing site classifier module 118) mutually "feed" each other, expanding the knowledge regarding a network environment and strengthening conclusions reached regarding suspect sites. Hence, the system 100 can be expected to grow its knowledge about a network environment in a relatively quick and dramatic fashion. This makes it a potentially valuable tool in alerting the user to undesirable network sites in a timely fashion within a rapidly changing network environment.

A top-down approach, by contrast, identifies problematic network sites by visiting the sites in succession and methodically tracing their links. Because the top-down approach does not have the same expansive capacity to grow its results from bottom up, it is potentially not as responsive to the evolving threats within a network environment compared to the bottom-up approach. However, in another implementation, the system 100 can combine the results of the bottom-up approach and the top-down approach. The top-down approach can identify suspect sites which can serve as input to the bottom-up approach, and vice versa. Further, the top-down approach can be used to confirm the conclusions reached in the bottom-up approach, and vice versa.

Figure 2:
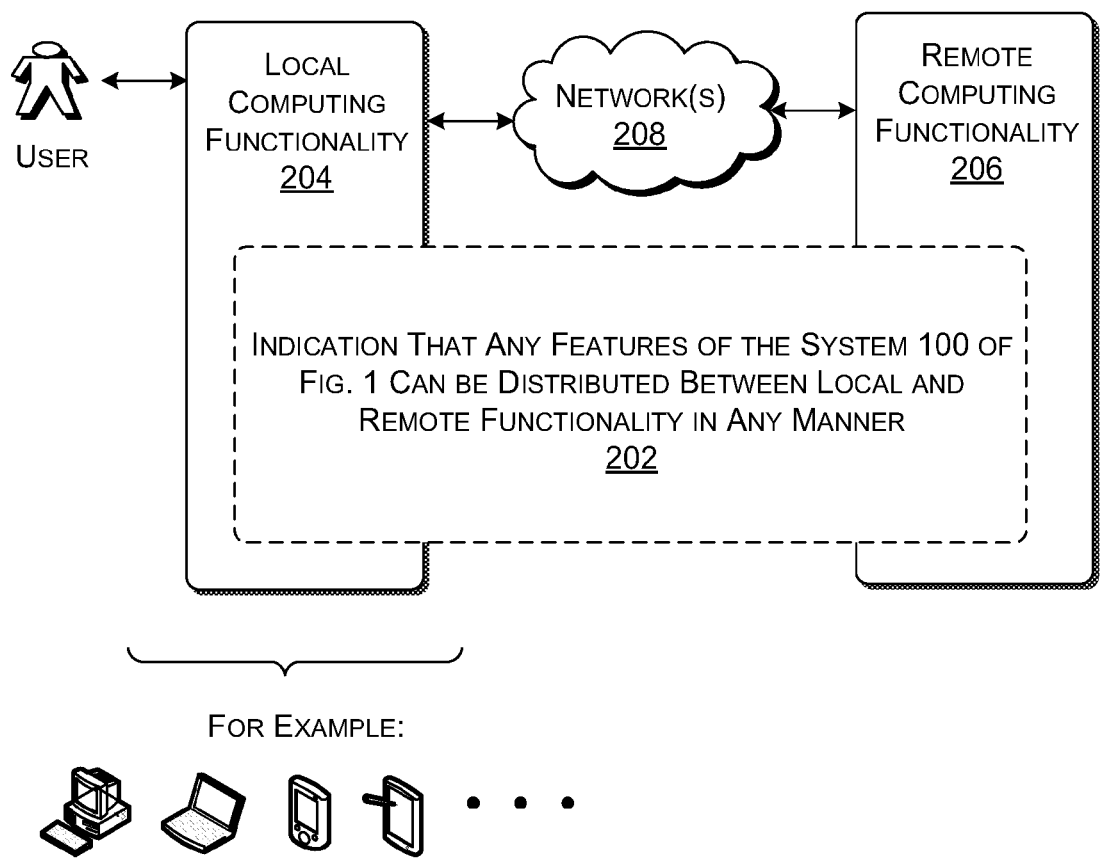
FIG. 2 shows one illustrative implementation of the system of FIG. 1.

FIG. 2 shows one implementation of the system 100 of FIG. 1. The dashed box 202 indicates that the functionality of the system 100 can be distributed between local computing functionality 204 and remote computing functionality 206 in any manner. The local computing functionality 204 is coupled to the remote computing functionality 206 by a network 208.

For example, the system 100 can rely on analysis functionality implemented on client devices (associated with the local computing functionality 204) and analysis functionality provided by one or more backend services (associated with the remote computing functionality 206). For example, the malware distribution modules 108 can be implemented at either (or both) the local computing functionality 204 or the remote computing functionality 206. The linking analysis module 112 can be distributed in a similar manner, but is most effectively implemented by a backend service using the remote computing functionality 206. Likewise, the model generation module 122 can be distributed, but is most effectively implemented by a backend service using the remote computing functionality 206. The landing site classifier module 118 itself can be employed at either (or both) the local computing functionality 204 or the remote computing functionality 206. Similarly, the action module 126 can be employed at either (or both) the local computing functionality 204 or the remote computing functionality 206.

The local computing functionality 204 can correspond to any type of functionality for performing the above-described functions, such as a personal desktop computing device, a laptop computing device, a personal digital assistant (PDA) type computing device, a stylus-type computing device, a mobile phone type computing device, a game console device, and so on. The remote computing functionality 206 can represent any type of remote processing infrastructure, such as one or more server-type computing devices in cooperation with one or more data stores (and potentially other types of data processing equipment). The resources of the remote computing functionality 206 can be provided at a single location or can be distributed over plural locations. The network 208 can represent a local area network, a wide area network (e.g., the Internet), or some combination thereof. The network 208 can be governed by any protocol or combination of protocols.

A.2. Malware Analysis Modules

As summarized above, the system 100 can use different types of malware analysis modules 108 (which can also be referred to more generically as simply analysis modules). These different types of malware analysis modules 108 can use different respective techniques to identify any type of potentially malicious content. (Certain parts of the following explanation are simplified by describing the use of the malware analysis modules 108 to identify malicious content, although it should be kept in mind that the malware analysis modules 108 can also identify benign content.)

A first type of malware analysis module is an antimalware analysis module that attempts to detect a malicious distribution site when a local computing device attempts to download content from that site through any mechanism. That is, the local computing device can include local records of known malicious content. The local computing device can compare the unknown content (e.g., a hash of such unknown content) with its records to identify potentially malicious content. The local computing device can also compare the unknown content with local records of known benign content, such as by comparing the unknown content with a white list which identifies known benign content. The local computing device can send a report to a backend service which alerts the backend service to its local analysis. One example of the above-described type of malware analysis module is an antivirus engine. For example, an antivirus engine can compare unknown content with respect to generic signatures. The generic signatures correspond to patterns in content that are known to be problematic; for example, part of a generic signature may correspond to strings that are associated with problematic content.

The local computing device can also send a report containing the hash and the network address (e.g., the URL) of the distribution site to the backend service. The backend service can then compare this information with known malicious and benign content to identify potentially undesirable distribution sites.

A second type of malware analysis module can analyze network sites that a user encounters through the use browsing functionality or the like. In particular, this browser-type of malware analysis module can identify sites which host content (e.g., executables, scripts, etc.). The browser-type of malware analysis module can then investigate this content to determine whether it is benign or malicious. In the manner described above, the browser-type of malware analysis module can perform local analysis of the network sites, backend analysis of the network sites, or a combination of local and backend analysis of the network sites.

A third type of malware analysis module can use network crawling functionality to actively probe a network environment (such as sites on the Internet) using a backend service. The network crawling functionality can identify sites which host content. In the manner described above, the network crawling functionality can then investigate this content to determine whether it is benign or malicious.

A fourth type of malware analysis module that can be used is described, for instance, in co-pending and commonly assigned U.S. patent application Ser. No. 12/358,246, entitled "Malware Detection Using Multiple Classifiers," to Jack W. Stokes, et al., filed on Jan. 23, 2009. That type of analysis module investigates whether unknown content is undesirable using a series of different type of classifiers: static classifiers; emulation classifiers; and behavioral classifiers. The analysis performed by these classifiers can be distributed between local computing functionality and remote backend computing functionality in any manner.

For example, the static classifiers attempt to determine whether unknown content is undesirable without actually executing it. For example, these types of classifiers can examine metadata associated with the content, strings used in the content, code associated with the content, and so on. The emulation classifiers attempt to determine whether unknown content is undesirable by executing this content in an emulation environment (without actually installing and running it in a normal mode). For example, these types of classifiers can examine APIs invoked by the unknown content and the parameters passed to the APIs. The behavioral classifiers attempt to determine whether the unknown content is undesirable by examining the behavior of the unknown content upon installing and running it.

This fourth type of malware analysis module can combine the results from different classifiers in different ways. In one case, a series of classifiers are invoked in a hierarchical mode. Here, the outcome of one classification analysis prompts the start of another; that is, the outcome of one classification analysis is "input" which feeds into another classification analysis. In another case, the classifiers can provide parallel analysis and provide a vector which expresses the conclusions of all the classifiers.

In the fourth type of malware analysis module, local computing devices can send a variety of reports to a backend service. The local computing devices can also optionally send content samples to the backend service. The backend service can then perform collective analysis on these reports (and content) to reach conclusions regarding content that is undesirable for any reason. By extension, this technology can be used to identify distribution sites that are undesirable for any reason. The conclusions reached at the backend service can be formulated in model weights or parameters which can then be fed back to models at the local computing devices.

The above explanation of different types of malware analysis modules is illustrative and non-exhaustive. Still other types of malware analysis modules (and combinations thereof) can be used to identify malicious distribution sites and benign distribution sites.

A.3. Linking Analysis Module

Figure 3:
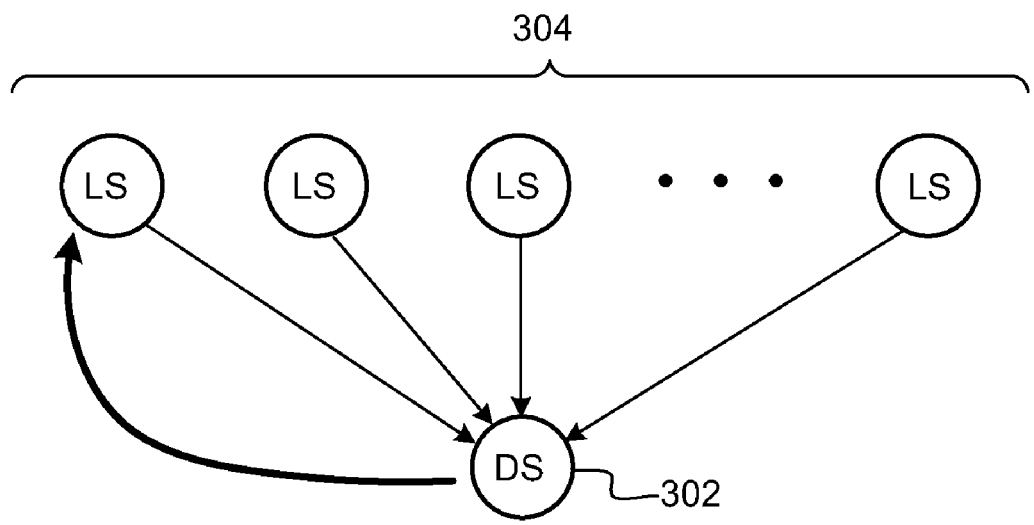
FIGS. 3 and 4 show two examples that demonstrate how network connectivity information can be used to identify suspect network sites.
Figure 4:
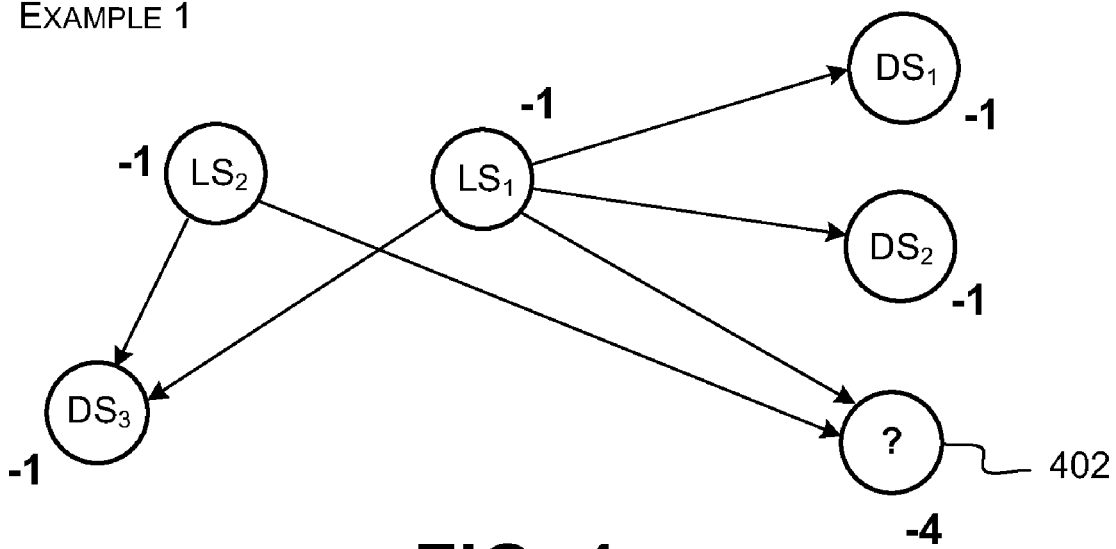

FIGS. 3 and 4 provide additional information regarding analysis performed by the linking analysis module 112 of FIG. 1. As shown in FIG. 3, the malware analysis modules 108 can identify a distribution site 302 that hosts malicious content. The linking analysis module 112 can use the network connectivity information 114 to identify one or more landing sites 304 which link to the distribution site 302. Although not shown, the linking analysis module 112 can also identify one or more landing sites that indirectly link to the distribution site 302 (e.g., through two or more "hops"). As indicated by the curved arrow, the operation of the linking analysis module 112 can be viewed as propagating or spreading the conclusions reached for the distribution site 302 to other sites. Although not shown, the linking analysis module 112 can perform the same type of analysis to determine landing sites which link to benign distribution sites.

In another mode of analysis, the linking analysis module 112 can perform cluster-type analysis to identify similarities among the linking behaviors of different sites. For example, the linking analysis module 112 can determine a number alternating paths between an unknown site and a set of distribution sites that are known to host malicious content (as illustrated in FIG. 4, discussed below). The linking analysis module 112 can identify the unknown site as a suspect site based on the number of identified alternating paths. The operative principle behind this conclusion is that an unknown network site which is even indirectly affiliated with malicious distribution sites may be potentially problematic.

Consider, for example, the graph shown in FIG. 4. Here, distribution sites $DS_1$, $DS_2$, and $DS_3$ have been determined to host malicious content. Assume that the risk level of site 402 is unknown. The linking analysis module 112 can determine that a particular landing site $LS_1$ links to $DS_1$, $DS_2$, $DS_3$, and the unknown site 402. Further the linking analysis module 112 can determine that a particular landing site $LS_2$ links to both $DS_3$ and the unknown site 402. In this scenario the negative scores for $DS_1$, $DS_2$, and $DS_3$ can be pushed up to $LS_1$, and this negative score can then be pushed back down to the unknown site 402. Further, the negative score for $DS_3$ can be pushed up to $LS_2$, and this negative score can be pushed back to the unknown site 402. The unknown site 402 has a negative score pushed to it along four distinct alternating paths, so it can be assigned a score of −4. Each of these paths consists of two alternating hops or steps: one hop from the unknown site 402 to an intermediate landing site that links to 402, and another hop to a known distribution site that also has a link from the intermediate site. Three of these paths pass through the intermediate landing site $LS_1$, namely (site 402←$LS_1$→$DS_1$), (site 402←$LS_1$→$DS_2$), (site 402←$LS_1$→$DS_3$), and one of these passes through the intermediate landing site $LS_2$, namely (site 402←$LS_2$→$DS_3$). The symbols ← and → are used to express the directionality of the links; for example "site 402←$LS_1$" refers to the link pointing from $LS_1$ to site 402.

The above principles can be expressed in mathematical terms as follows. The goal is to determine, for any candidate site X, the number of times (z(X)) that any page m that links to site X also links to a known malicious distribution site. This corresponds to the number of alternating paths from site X to known distribution sites, as described in the previous paragraph. z(X) can be described by the following expression for the case in which there are two alternating hops between the unknown site X and any known malicious distribution site:

$$z(X)=yA=sA'A \qquad (1).$$

Here, s is an indicator vector that identifies a collection of known malicious distribution sites. In particular, $s(Z)=-1$ if Z is a known malicious distribution site, and $S(Z)=0$ otherwise. A corresponds to an adjacency matrix of the network connectivity information 114, where $A(u, v)=1$ if the site U links to the site v. A' is the transpose of A. $y=sA'(X)$ corresponds to the number of links from the site X to known malicious distribution sites.

Equation (1) shows that z(X) can be computed using two matrix-vector multiplications. The vectors s, y, and z are all sparse. The total complexity of computing z is dominated by the cost of performing these sparse matrix-vector multiplications, which is equal to the total number of distinct alternating paths between the known malicious distribution sites identified in s and all other sites in the graph.

Figure 5:
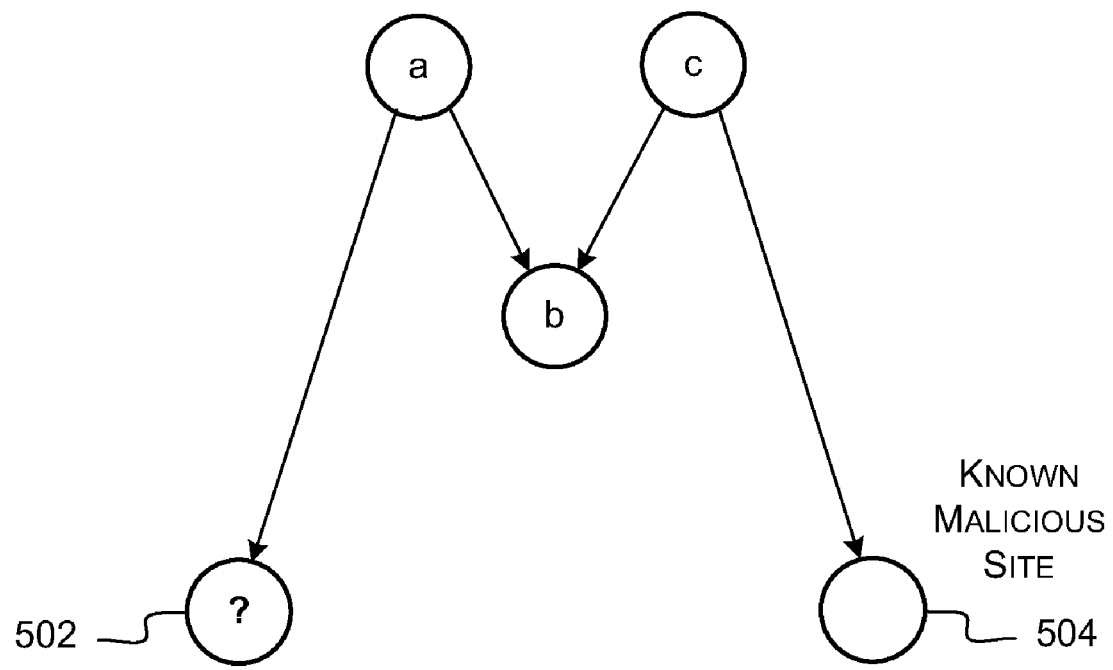
FIG. 5 shows how the network connectivity information can be used to analyze sites connected via several alternating steps.

The analysis above assigns a nonzero suspicion score to the set of sites within two alternating steps of an initial seed set of known malicious distribution sites s. In one approach, the analysis can be extended to assign scores to a larger set of sites that are several alternating steps from the initial seed set. For example, FIG. 5 shows an unknown site 502 that is linked to a known malicious site 504 by more than two alternating steps. That is, a first pair of alternating steps connects the known malicious site 504 to site b (via the intermediary site c), and a second pair of alternating steps connects site b to the unknown site 502 (via the intermediary site a). The number alternating paths q in common can be described using the following expression using an alternating random walk approach:

$$q=s(W'W)^k \qquad (2).$$

Here, s is an indicator vector that identifies a collection of known malicious distribution sites. W is a random walk transition matrix on an out-link graph, wherein $W(x, y)=1/\text{outdegree}(x)$ if x links to y, and is 0 otherwise. The term outdegree (x) represents the number of links from x. W' is a random walk transition matrix on an in-link graph, where $W'(x, y)=1/\text{indegree}(x)$ if y links to x, and is 0 otherwise. Here, indegree(x) is a number of links to x.

Note that the vector q is computed by first following in-links from the initial set, then out-links. At each step, the approach divides by the indegree or outdegree. This alternating pattern is repeated for k steps. By increasing the repetition parameter k it is possible to take into account longer alternating paths when determining the degree of relation between an unknown network site and the known malicious distribution sites. For example, FIG. 5 shows one alternating path for k=2, meaning that there are two repetitions of the back-and-forth computation described above.

A.4. Landing Site Classification System

As described above, the collection module 120 collects property information regarding landing sites. The collection module 120 feeds the property information to the model generation module 122. The model generation module 122 uses the property information, along with the safety-related status information, to generate the landing site classifier module 118. The safety-related status information provides an indication of whether the landing sites invoke malicious content (e.g., by directly hosting malicious content or linking to malicious content).

The role of the property information is to identify properties of the landing sites which correlate with their propensity to link to either malicious content or benign content. Without limitation, any one or more of the following list of properties can be collected for input to the model generation module 122. This list is non-exhaustive. Any of the properties can be continuous or categorical or some other form. A continuous property can take on a range of values. A categorical property takes on one of a discrete number of values depending on the classification of the site.

- In-degree. This property identifies how many other landing sites link to the landing site under consideration.
- Out-degree. This property identifies how many other landing sites and distribution sites the landing site under consideration links to.
- Page quality score. This property provides a score which measures the quality of a site (e.g., page) under consideration. A site with a high quality score is more likely to convey meaningful (e.g., non-spam) content than a site with a low quality score.
- Spam page score. This property provides a score which measures the likelihood that the site under consideration is a spam site, e.g., a site which provides spam content. Spam content refers to any unwanted content that is typically provided to a large number of recipients through various techniques.
- Key word stuffing score. This property defines a score which measures the likelihood that the site under consideration includes a large number of keywords that are not directly relevant to the site, e.g., to increase the chances that this site will match a user's search.
- Blog score. This property defines a score which measures the likelihood that the site is a blog site. A blog site is a site that allows users to post journal-type entries.
- Spam blog score. This property defines a score which measures the likelihood that the site is both a spam site and a blog site.
- Post score. This property defines a score which measures the likelihood that the site is a posting-type site, e.g., a site that allows users to post content.
- Spam post score. This property defines a score which measures the likelihood that the site is spam-posting-type site, e.g., a site in which spam content may be posted.
- Guest book score. This property defines a score which measures the likelihood that the site hosts a guest book in which users can sign in.
- Adult web site score. This property defines a score which measures the likelihood that the site hosts adult content.
- Spam white list. This property defines whether the URL of this site appears on a list of sites which are classified as non-spam sites.
- Spam black list. This property defines whether the URL of the site is on a list of sites which are classified as spam sites.
- Parked domain score. This property defines a score which measures the likelihood that the site is a parked domain. A parked domain refers to a site that is not affiliated with any active service.
- Splog score. This property defines a score which measure the likelihood that the site is a splog-type site. A splog-type site is a site which may include artificial ("made up") blog-type content, which may, in turn, link to other unwanted content.

To repeat, the list of properties given above is representative and non-limiting. Other implementations can omit one or more of the properties identified above, and/or can use additional properties. For example, in another case, the collection module 120 can examine browser logs or toolbar logs to identify the probability that a landing site will route traffic to one or more distribution sites. This information can serve as another feature (e.g., property) that can be used to train the landing site classifier module 118.

In another example, the collection module 120 can accept the analyses provided by one or more distribution site classifiers, such as any of distribution site classification tools described in Section A.2 above. These analyses can identify whether a distribution site that is associated with a landing site under consideration likely hosts malicious (or benign) content. These analyses can serve as another feature (e.g., property) that can be used to train the landing site classifier module 118.

Further information will now follow regarding the operation of the model generation module 122. As explained above, the model generation module 122 can accept the above-described property information, together with safety-related status information. The model generation module 122 creates the landing site classifier module 118, e.g., by training it using a training set of the property information and safety-related status information.

In one illustrative and non-limiting implementation, the model generation module 122 can use using logistic regression to train the landing site classifier module 118. This approach entails learning the parameters for a linear hyperplane decision boundary. The hyperplane divides the input space so that malicious landing sites map to one side of the hyperplane and benign landing sites map to the other side. More specifically, logistic regression learns a model of the form:

$$P(\text{class } i \mid \vec{x}) = 1 \Big/ \left(1 + \exp\left(-\sum_j w_{ij} x_j + b_i\right)\right). \quad (2)$$

Here, $x_j$ is the value of the jth feature from the metadata. Logistic regression chooses the parameters $w_{ij}$ and $b_i$ to minimize the cross-entropy loss function E, as defined below:

$$E = -\sum_n \sum_{i=1}^{I} t_{in} \log P(i \mid \vec{x}_n) + (1 - t_{in}) \log(1 - P(i \mid \vec{x}_n)). \quad (3)$$

Here, $t_{in}$ is 1 if the nth input vector ($\vec{x}_n$) is the class i, and is 0 otherwise, and I is the total number of classes. For the case of classifying a landing site as either malicious or benign, I is 2.

In the above examples, the landing site classifier module 118 is trained to predict whether a landing site is malicious or benign. But a landing site classifier module can also be created that can identify the type of the malicious content (e.g., worm, virus, etc.) that is encountered. In addition, or alternatively, a landing site classifier module can identify a type of malware family (e.g., RBOT, SDBOT, etc.) that is encountered. Similarly, a landing site classifier module can identify multiple types of benign content that are encountered (e.g., instant messenging application, word processing application, etc.) When classifying multiple types of malicious and benign content, I in equation (3) is the sum of the number of malicious and benign types Finally, in the above examples, the landing site classifier module 118 is applied to determine whether unknown landing sites are benign or malicious. In addition, a distribution site classifier module (not shown) can be trained to predict whether distribution sites are benign or malicious. Such a distribution site classifier module can be trained using property information and safety-related status information in the manner described above. The property information can include all or part of the property information described above for the landing site classifier module. In addition, the property information for the distribution site classifier module may optionally include metadata and other information regarding the content hosted by the distribution sites. For instance, this kind of property information that pertains to a distribution site can be obtained using any of the techniques described above in Section A.2.

B. Illustrative Processes

FIGS. 6-9 show procedures that illustrate different aspects of the operation of the system 100 in flowchart form. Since the principles underlying the operation of the system 100 have already been described in Section A, certain operations will be addressed in summary fashion in this section.

Figure 6:
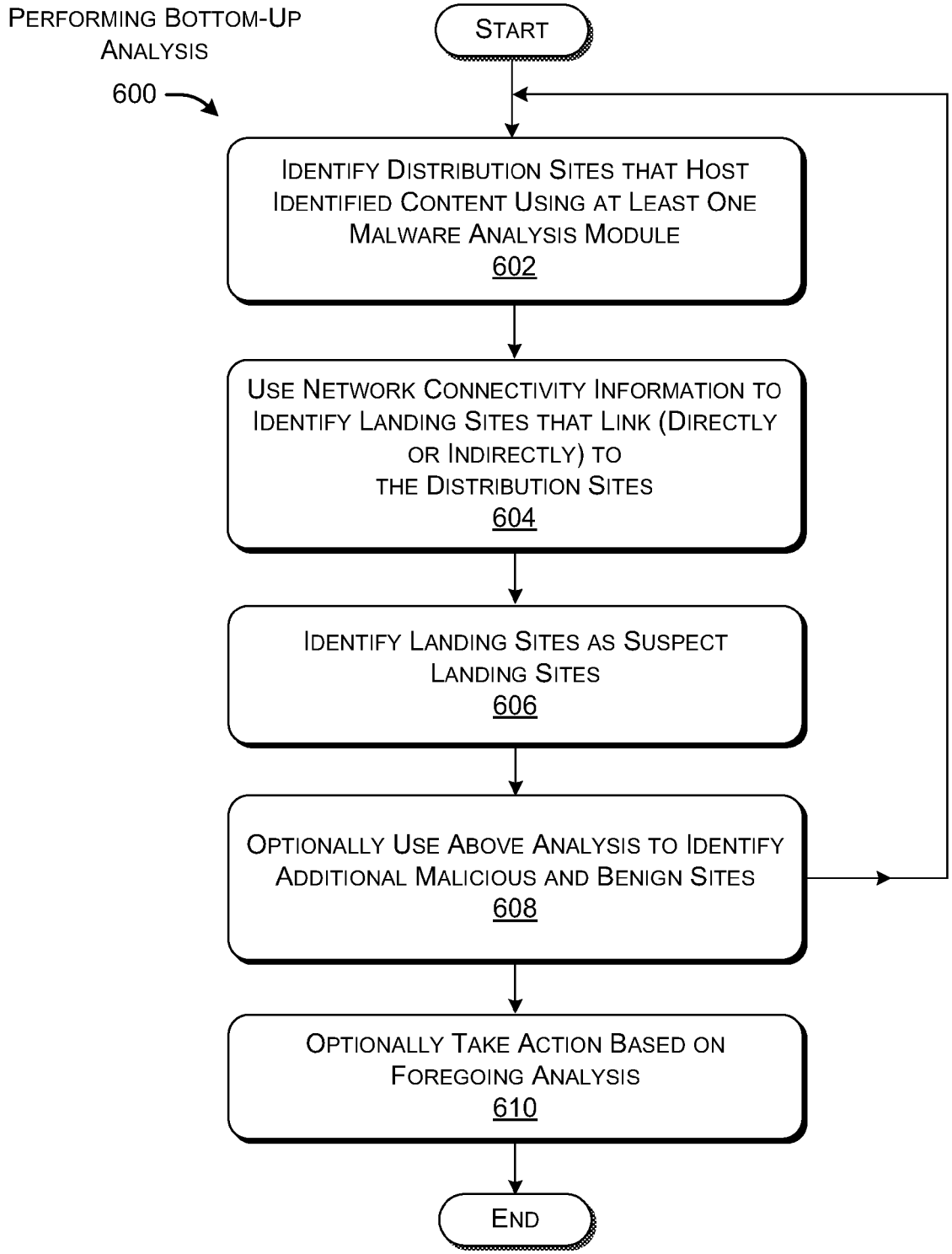
FIG. 6 shows an illustrative procedure for performing bottom-up analysis to identify suspect network sites.

Starting with FIG. 6, this figure shows a procedure 600 for performing bottom-up analysis.

In block 602, the system 100 identifies distribution sites that host malicious or benign content using at least one malware analysis module.

In block 604, the linking analysis module 112 uses network connectivity information 114 to identify landing sites that link, either directly or indirectly, to the identified distribution sites.

In block 606, the system 100 may identify the landing sites as suspect sites (e.g., as either suspected malicious landing sites or suspected benign landing sites).

In block 608, the system 100 can optionally apply additional analyses to confirm the conclusions in block 606 (such as by downloading suspected malicious content and investigating whether it is in fact undesirable). The system 100 can also apply the conclusions reached in block 606 to identify additional malicious and benign sites.

In block 610, the system 100 may optionally take any preventive or corrective action on the basis of the foregoing analysis, e.g., so as to address a potential safety-related concern.

Figure 7:
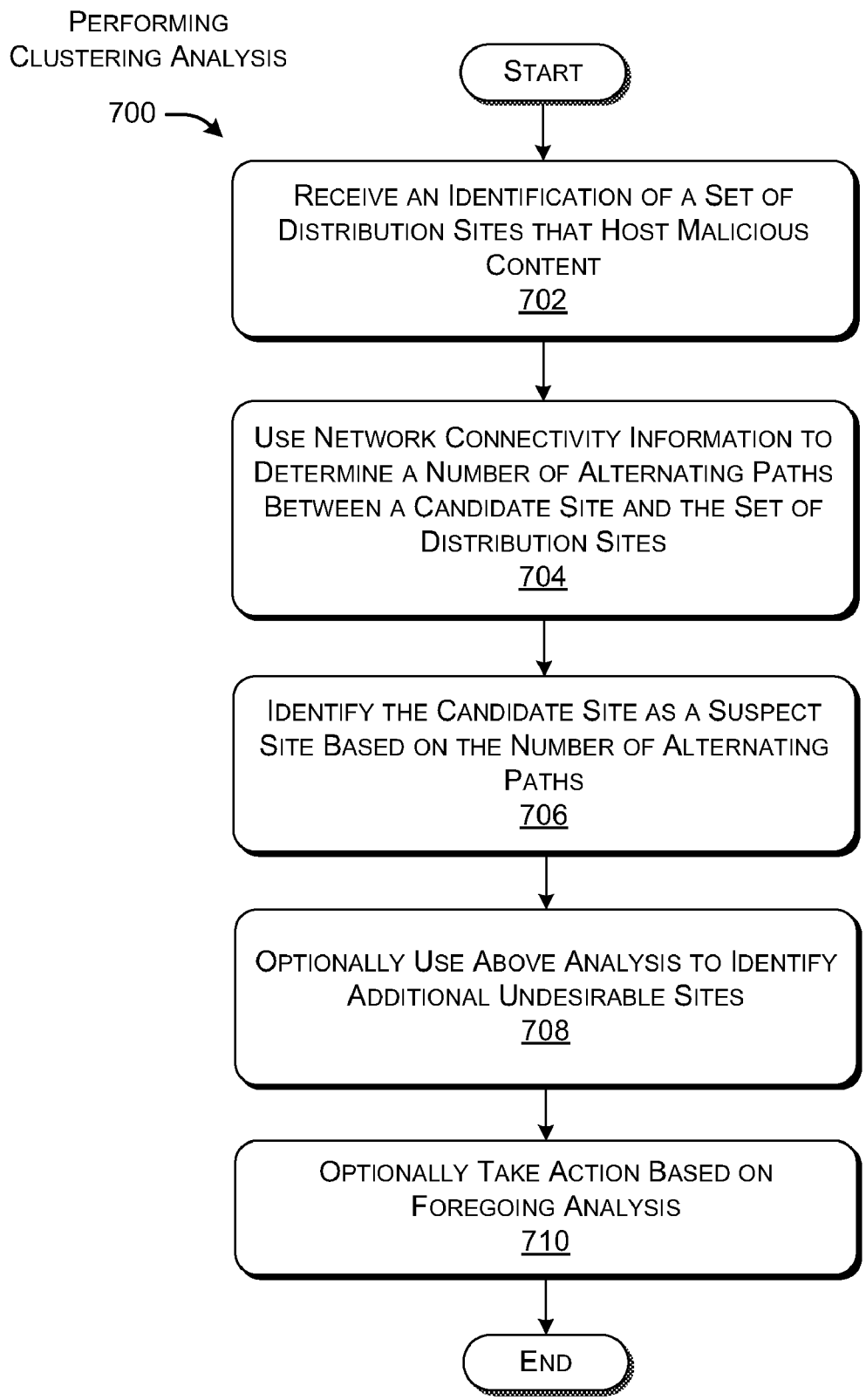
FIG. 7 shows an illustrative procedure for performing clustering analysis using network connectivity information to identify suspect network sites.

FIG. 7 shows a procedure for performing clustering analysis using the linking analysis module 112.

In block 702, the linking analysis module 112 may receive an identification of a set of distribution sites that host malicious content (e.g., from the malware analysis modules 108).

In block 704, the linking analysis module 112 can use the network connectivity information 114 to identify a number of alternating paths between an unknown network site (e.g., a candidate network site) and the set of known malicious distribution sites.

In block 706, the system 100 can identify the candidate site as a suspect site on the basis of the analysis provided in block 704. For example, this operation may constitute reaching a conclusion that a site is a likely malicious distribution site, or determining that the site is a likely benign site.

In block 708, the system 100 can optionally expand the conclusions reached in block 606 to identify other potentially problematic sites. The system 100 can also perform additional analyses to confirm the conclusions reached in block 606.

In block 710, the system 100 may optionally take any preventive or corrective action on the basis of the foregoing analysis.

Figure 8:
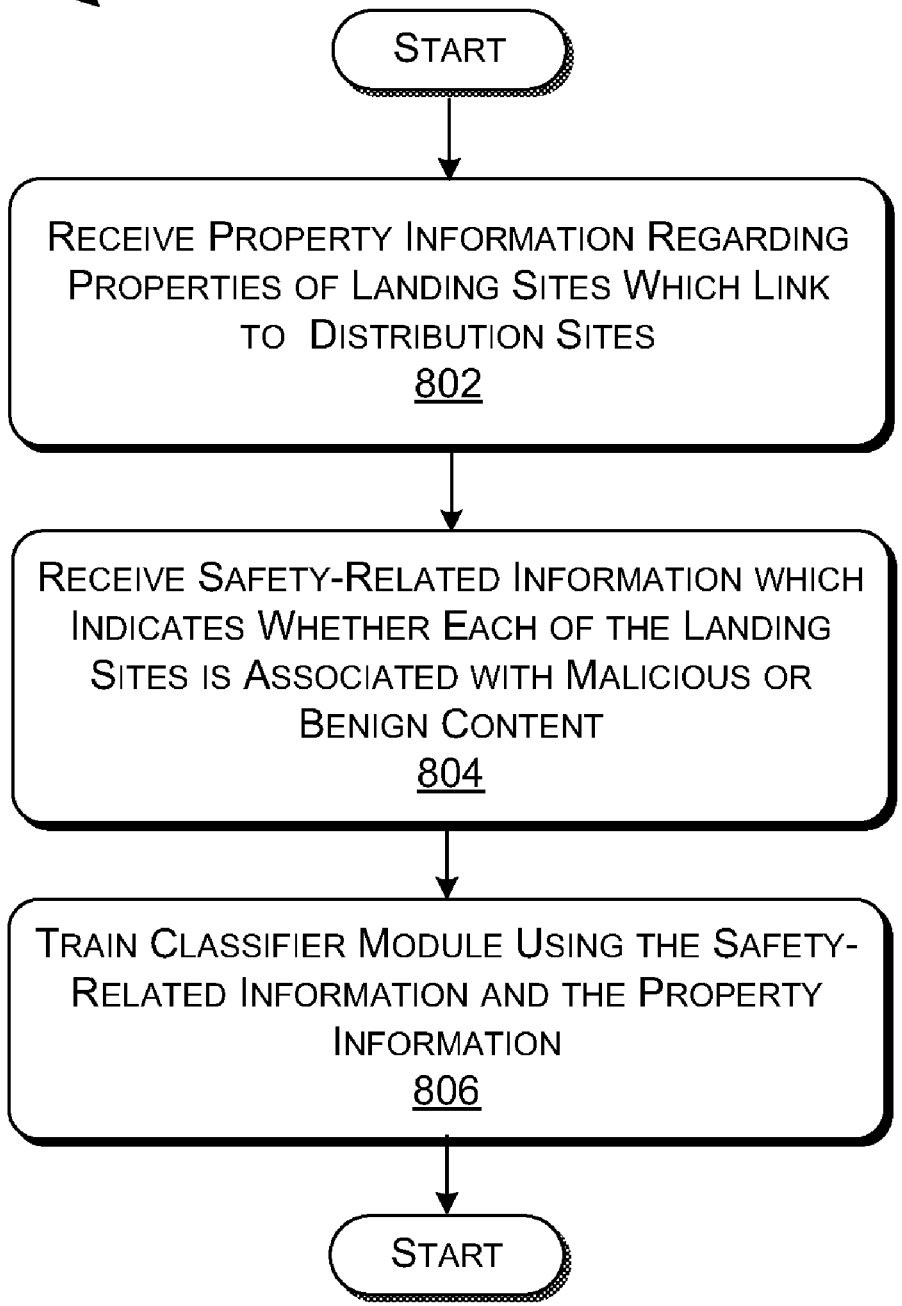
FIG. 8 shows an illustrative procedure for training a classifier module to identify suspect landing sites.

FIG. 8 shows a procedure 800 for performing training in the model generation module 122.

In block 802, the model generation module 122 identifies property information associated with a group of landing sites. In one example, the landing sites link directly to one or more distribution sites. In another example, the landing sites link indirectly to one or more distribution sites.

In block 804, the model generation module 122 receives safety-related status information which indicates whether the landing sites invoke malicious or benign content. (Additional information can be received in the case that the model generation module 122 is being used to build a classifier module that can identify different types of malicious sites and benign sites.)

In block 806, the model generation module 122 trains the landing site classifier module 118 on the basis of the property information, in association with the safety-related status information.

Figure 9:
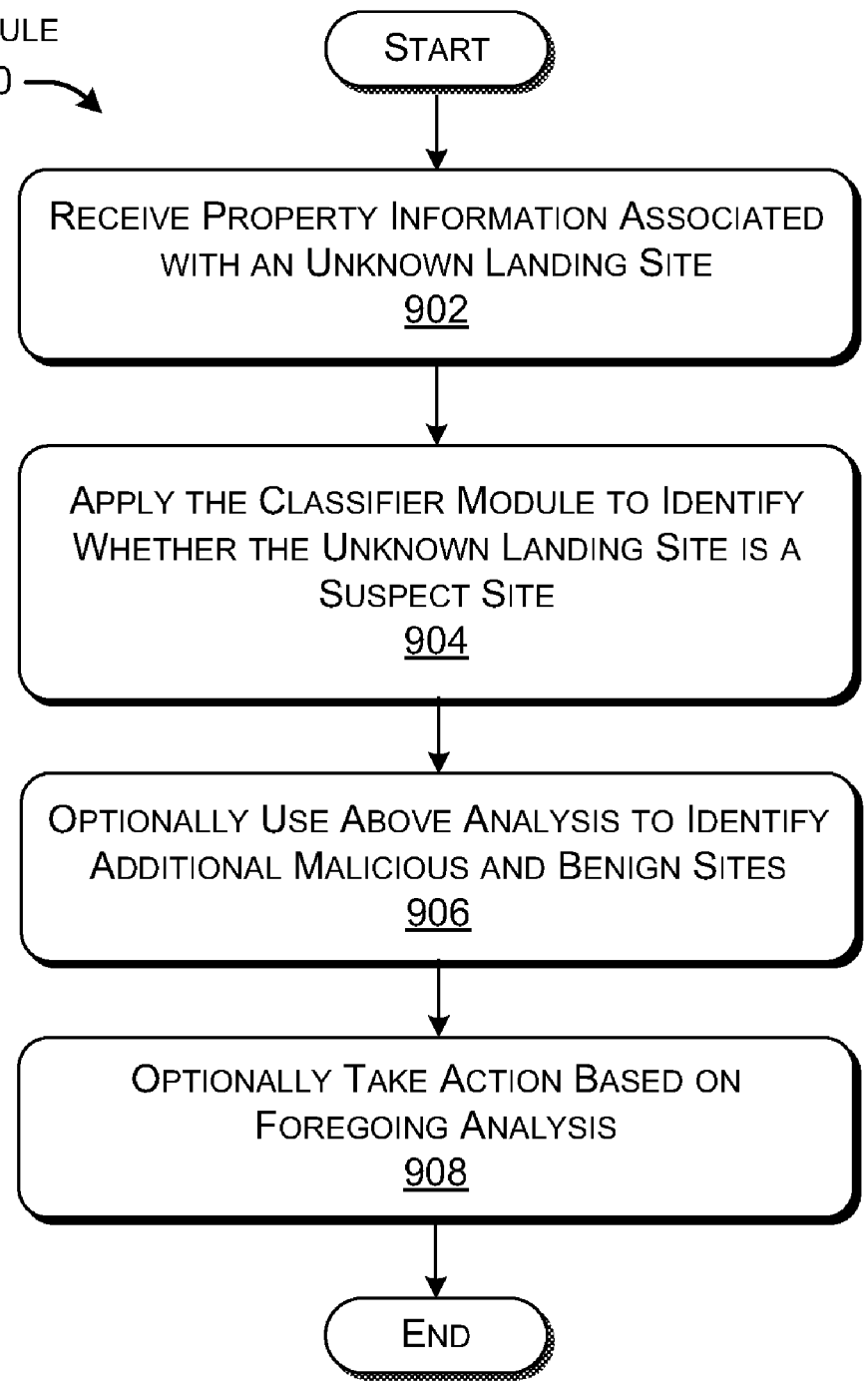
FIG. 9 shows an illustrative procedure for applying the classifier module that has been trained as per the procedure of FIG. 8.

FIG. 9 shows a procedure 800 for applying the landing site classifier module 118 that was trained in the procedure 700 of FIG. 8.

In block 902, the landing site classifier module 118 receives property information associated with an unknown landing site.

In block 904, the landing site classifier module 118 is used to determine the likelihood that the unknown landing site links to malicious content or benign content. This conclusion can be reached without necessarily accessing and performing further analysis on any unknown content that may be linked to the unknown landing site.

In block 906, the system 100 can optionally perform additional analysis based on the conclusion reached in block 904. For example, additional analysis tools and/or a human analyst can be used to confirm the accuracy of the classification made by the landing site classifier module 118. Further, additional analysis tools can be used to identify additional suspect sites on the basis of the foregoing analysis.

In block 908, the system 100 may optionally take any preventive or corrective action on the basis of the foregoing analysis.

C. Representative Processing Functionality

FIG. 10 sets forth illustrative electrical data processing functionality 1000 that can be used to implement any aspect of the functions described above. With reference to FIGS. 1 and 2, for instance, the type of processing functionality 1000 shown in FIG. 10 can be used to implement any aspect of the system 100. In one case, the processing functionality 1000 may correspond to any type of computing device that includes one or more processing devices.

The processing functionality 1000 can include volatile and non-volatile memory, such as RAM 1002 and ROM 1004, as well as one or more processing devices 1006. The processing functionality 1000 also optionally includes various media devices 1008, such as a hard disk module, an optical disk module, and so forth. The processing functionality 1000 can perform various operations identified above when the processing device(s) 1006 executes instructions that are maintained by memory (e.g., RAM 1002, ROM 1004, or elsewhere). More generally, instructions and other information can be stored on any computer readable medium 1010, including, but not limited to, static memory storage devices, magnetic storage devices, optical storage devices, and so on. The term computer readable medium also encompasses plural storage devices. The term computer readable medium also encompasses signals transmitted from a first location to a second location, e.g., via wire, cable, wireless transmission, etc.

The processing functionality 1000 also includes an input/output module 1012 for receiving various inputs from a user (via input modules 1014), and for providing various outputs to the user (via output modules). One particular output mechanism may include a presentation module 1016 and an associated graphical user interface (GUI) 1018. The processing functionality 1000 can also include one or more network interfaces 1020 for exchanging data with other devices via one or more communication conduits 1022. One or more communication buses 1024 communicatively couple the above-described components together.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implementing using electrical data processing functionality, for identifying suspect network sites in a network environment using bottom-up analysis, comprising:
   using at least one malware analysis module to identify at least one distribution site that hosts identified content, the identified content corresponding to either malicious executable content or benign executable content, said at least one distribution site corresponding to a network site from which the identified content is accessible at an associated network address, and where said at least one distribution site does not link to any landing site;
   using network connectivity information to identify at least one landing site that links to the identified content hosted at said at least one distribution site, said at least one landing site corresponding to a network site that is directly accessible to users; and
   identifying said at least one landing site as at least one suspect site,
   the method being repeated as new distribution sites that host identified content are identified, as the users interact with the network environment,
   said using at least one malware analysis module, using network connectivity information, and identifying being performed by the electrical data processing functionality.

2. The method of claim 1, wherein said at least one malware analysis module includes an antimalware analysis module that detects a distribution site that hosts malicious or benign content upon an attempt to load the malicious or benign content from the distribution site.

3. The method of claim 1, wherein said at least one malware analysis module detects a distribution site that hosts malicious or benign content upon encountering the distribution site in use of browsing functionality.

4. The method of claim 1, wherein said at least one malware analysis module investigates a network for presence of distribution sites which host malicious and benign content using network crawling functionality.

5. The method of claim 1, wherein said at least one malware analysis module detects a distribution site that host malicious or benign content based on metadata associated with the malicious or benign content of the distribution site.

6. The method of claim 1, further comprising:
   determining, based on the network connectivity information, a number of alternating paths between a candidate network site and a set of distribution sites that host malicious content, and identifying the candidate network site as a suspect site based on the number of alternating paths,
   wherein each alternating path includes at least one pair of alternating steps, a first step in the pair pointing from an intermediary landing site to a distribution site that hosts malicious content, and a second step in the pair pointing from the intermediary landing site to another site, where that other site is either the candidate network site or a site that is ultimately linked to the candidate network site through at least one additional alternating pair.

7. The method of claim 1, further comprising:
   collecting property information associated with said at least one landing site that links to the identified content at said at least one distribution site; and
   training a landing site classifier module based on the property information, in association with safety-related status information for said at least one landing site, the safety-related status information indicating whether each of said at least one landing site invokes malicious content,
   the landing site classifier module, once trained, predicting whether an unknown landing site links to malicious content or benign content.

8. A tangible computer readable storage medium for storing computer readable instructions, the computer readable instructions providing a linking analysis module when executed by one or more processing devices, the computer readable instructions comprising:
   logic configured to receive an identification of a set of distribution sites that host malicious content, each distribution site corresponding to a network site from which the malicious content is accessible at an associated network address;
   logic configured to use network connectivity information to determine a number of alternating paths between a candidate network site and the set of distribution sites that host malicious content,
   each alternating path including at least one pair of alternating steps, a first step in the pair pointing from an intermediary site to a distribution site that hosts malicious content, and a second step in the pair pointing from the intermediary site to another site, where that other site is either the candidate network site or a site that is ultimately linked to the candidate network site through at least one additional alternating pair; and
   logic configured to identify the candidate network site as a suspect site based on the number of alternating paths.

9. The tangible computer readable storage medium of claim 8, wherein each of the alternating paths relates the candidate network site to the set of distribution sites through two alternating steps.

10. The tangible computer readable storage medium of claim 9, wherein the number of alternating paths is determined based on an expression sA'A, where s identifies the set of distribution sites, A is an adjacency matrix of the network connectivity information, and A' is the transpose of A.

11. The tangible computer readable storage medium of claim 8, wherein each of the alternating paths relates the candidate network site to the set of distribution sites through more than two alternating steps.

12. The tangible computer readable storage medium of claim 11, wherein the number of alternating paths is determined based on an expression $s(W'W)^k$, where s identifies the set of distribution sites, W is a random walk transition matrix on an out-link graph associated with the network connectivity information, W' is a random walk transition matrix on an in-link graph associated with the network connectivity information, and k is a repetition parameter.

13. A system, implemented by computing functionality, comprising:

- at least one malware analysis module, implemented by the computing functionality, configured to identify a group of distribution sites, each distribution site hosting malicious or benign executable content that is downloadable from a network address associated with the distribution site, where each distribution site does not link to any landing site;
- a linking analysis module, implemented by the computing functionality, configured to identify a group of landing sites that link to the group of distribution sites, each landing site corresponding to a network site that is directly accessible to a user;
- a collection module, implemented by the computing functionality, configured to identify property information associated with the group of landing sites; and
- a model generating module, implemented by the computing functionality, configured to:
  - receive safety-related status information which indicates whether each of the landing sites contains or links to malicious content;
  - receive the property information associated with the group of landing sites; and
  - train a landing site classifier module based on the safety-related status information and the property information,
  - the landing site classifier module, once trained, predicting whether an unknown landing site links to malicious content or benign content.

14. The system of claim 13, wherein the property information associated with a landing site comprises:

information regarding other network sites that are associated with the landing site; and information regarding content associated with the landing site.

15. The system of claim 13, wherein the property information associated with a landing site comprises an analysis, by a distribution site classifier, of content hosted by a distribution site that is linked to the landing site.

16. The system of claim 13, wherein the landing site classifier module is further configured to identify a type of content associated with the unknown landing site.

* * * * *